Nov. 1, 1932.  E. F. MOODYMAN  1,886,040
ELECTRIC MOTOR
Filed Aug. 28, 1930   2 Sheets-Sheet 1
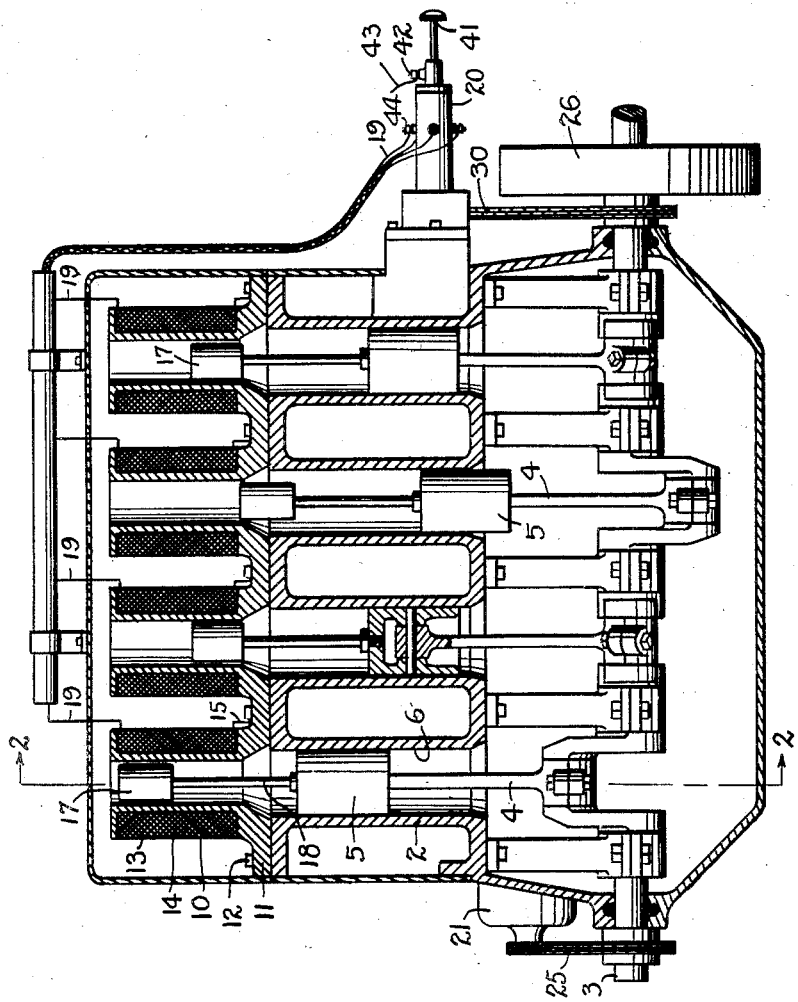
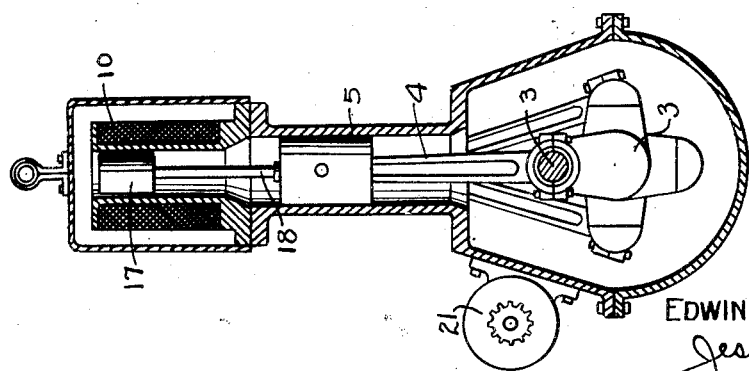
Inventor
EDWIN F. MOODYMAN.
By Jesse R. Stone
& Lester B. Clark
Attorneys.

Nov. 1, 1932.  E. F. MOODYMAN  1,886,040
ELECTRIC MOTOR
Filed Aug. 28, 1930   2 Sheets—Sheet 2

Inventor
EDWIN F. MOODYMAN
By Jesse R Stone
Lester B Clark.
Attorneys

Patented Nov. 1, 1932

1,886,040

UNITED STATES PATENT OFFICE

EDWIN F. MOODYMAN, OF HOUSTON, TEXAS, ASSIGNOR OF ONE-TENTH TO W. S. HUNT, OF HOUSTON, TEXAS

ELECTRIC MOTOR

Application filed August 28, 1930. Serial No. 478,425.

The invention relates to an improvement in motors of the multi-cylinder type which are adapted to be driven by the operation of electric solenoids.

It is one of the objects of the invention to devise a motor which may be used in combination with a portion of the structure of ordinary types of internal combustion engines.

Another object of the invention is to devise a multi-cylinder engine which is adapted to be driven by electric power.

Still another object of the invention is to devise an engine which may be used to obtain an economical and efficient flow of power for use in vehicles and for other purposes.

It is also an object of the invention to provide a structure which may be operated by the positive pull exerted when a solenoid is magnetized.

A still further object of the invention is to time the operation of the various solenoids in order that an even flow of power will result.

It is also an object of the invention to provide a generator in combination with the motor or engine so that with the addition of power from an outside source sufficient current will be generated to operate the solenoids.

It is to be understood that the showing in the drawings is merely one adaptation of the invention and that various modifications may be made therein without departing from the spirit of the invention, which may be readily understood by those skilled in the art when the following description is considered in connection with the accompanying drawings wherein Fig. 1 is a central vertical section through a motor equipped with the invention.

Fig. 2 is a section taken on the line 2—2 of Fig. 1 and looking in the direction of the arrows.

Figure 3:
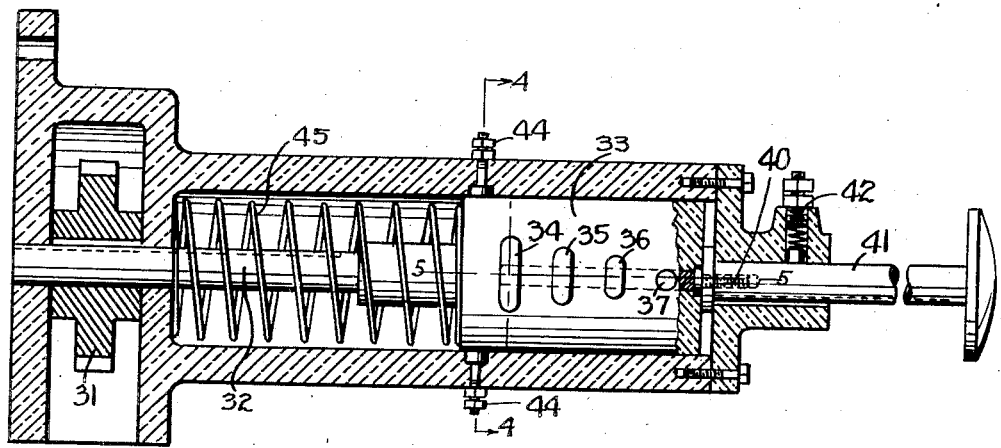
Fig. 3 is a sectional view of the timing mechanism showing the means for adjusting the speed at which the motor will operate.
Figure 4:
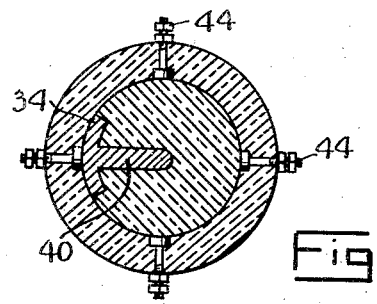
Figure 5:
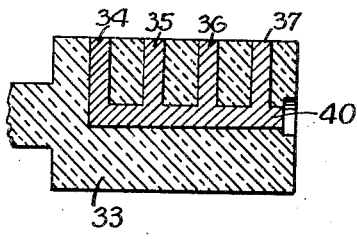

Figs. 4 and 5 are sections taken on the lines 4—4 and 5—5, respectively, of Fig. 3.

Figure 6:
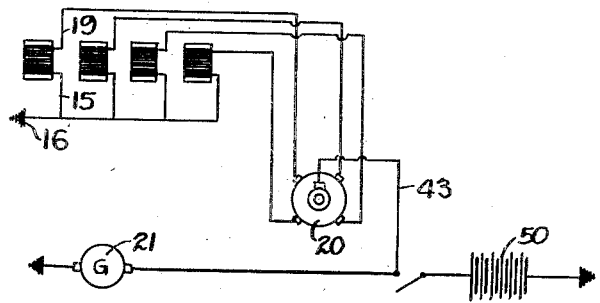

Fig. 6 is a diagrammatic view showing the wiring arrangement of the motor, generator and battery.

By having reference to Fig. 1 an engine block 2 has been illustrated as being provided with a crank shaft 3, a plurality of connecting rods 4 and pistons 5. These pistons are arranged for reciprocation in the cylinders 6. In other words, the block 2 may be the same as employed in internal combustion engines such as used in automobiles. The cap or head of such motor has been removed as well as the cam shaft and poppet valves. In place of the head or cap I have provided a series of solenoids which are arranged upon the base member 11, which may be anchored to the head of the motor by means of the bolts 12 in the same manner as the original head which was placed on the motor.

Each of the solenoids 13 embodied in the set 10 is formed with the windings of wire 14. One end 15 of each of these windings is grounded to the engine block as illustrated diagrammatically at 16 in Fig. 6. The other end 19 of each winding leads to a distributor 20, which is, in turn, connected with a generator 21, which is adapted to provide a flow of current at the proper voltage to cause operation of the solenoids. It is to be understood that the windings of these solenoids 13 may be constructed in any desired manner to obtain the results in view.

The core of each of the solenoids is indicated at 17 and is connected by means of a rod 18 to the upper end of each of the pistons 5. This core 17 is adapted for sliding movement inside of the windings 14 of each of the solenoids when such solenoid is energized by a flow of current through the distributor 20.

Particular attention is directed to the crank shaft 3, which is arranged so that each of the cranks thereon extends at a ninety degree angle with respect to the next adjacent crank. In this manner the four solenoids will exert a pull during each of the quarters of the revolution of the crank shaft. The generator 21 is shown as being connected by means of a belt or chain 25 with the crank shaft.

It is also intended that the fly wheel 26 will be provided in order to balance the operation of the motor. A second belt 30 is also connected with the crank shaft 3 and is arranged to drive the distributor 20. This distributor, as shown in section in Fig. 3, is provided with a pinion 31 over which the belt or chain 30 is adapted to pass. This pinion is keyed to the shaft 32 which carries a distributor head 33. This head is provided with a plurality of contacts 34, 35, 36 and 37, which are of different lengths. These contacts, however, are each connected to the same outlet 40. This outlet 40 is connected to the plunger 41 which is adapted to be engaged by the contact 42, which is connected with the wire 43 leading to the generator 21.

The head 33 is arranged for sliding movement by operation of the plunger 41 so that any one of the contacts on this plunger head may be moved into a position so that upon its rotation it will engage all of the four contacts 44. It is to be understood that the number of contacts 44 which are provided indicate the number of cylinders which are in operation on the motor, and in the present illustration four such contacts will be used.

Figs. 4 and 5 show sections of the arrangement whereby the contacts 34 to 37 are connected with the outlet 40. A suitable spring 45 is provided beneath the head 33 of the distributor so that it will be normally retained in a neutral position as seen in Fig. 3. The body of this distributor head is preferably made of some dielectric material. With this construction it seems apparent that the plunger 41 may be moved so that any one of the contacts will be moved into position to engage the binding posts 44. The contacts 34 to 37 may be arranged as a tapered continuous contact if desired.

It is intended that by the length of the contact with the binding post the interval during which the solenoids will be energized can be governed, and that the period during which energy is applied to the solenoids will govern the speed thereof. Thus, in the event that the invention is applied to vehicles such as an automobile, the plunger 41 will take the place of the usual acceleration pedal by which the speed of the car is governed.

A battery 50 is illustrated in Fig. 6 as representative of some additional source of power which may be utilized in combination with the invention. This battery would supply the additional power required for the operation of the motor in excess of that which would be produced by the generator 21.

It is also intended that the invention may be applied wherever motive power is to be used and that the present description merely illustrates, for purposes of explanation one of the embodiments which the invention may assume.

Having described my invention, what I desire to secure by Letters Patent is:

1. An electric motor including in combination a multicylinder engine, a solenoid connected to each cylinder, a core for each solenoid, a crank shaft to which each core is connected, and means to provide electric energy to said solenoids to cause rotation of said shaft, said means including a connection which is adjustable to alter the interval during which said solenoids are energized.

2. A multicylinder motor including a solenoid for each cylinder, means to vary the time of the operation of each solenoid, and a crankshaft rotatable by the movement of said solenoids.

3. In combination a source of electric energy, a plurality of solenoids to be energized periodically from said source, a shaft rotatable by the reciprocation of the cores of said solenoids to provide a power unit, and means to vary the period of energization of said solenoids.

4. A device of the character described including a crankshaft and fly wheel, pistons connected to said shaft, a solenoid core connected to each of said pistons, a solenoid winding adapted to be energized to attract said core and rotate said shaft, a source of electric energy to energize said solenoids, and an adjustable rotary switch to control the time of operation of said solenoids.

5. A motor of the type described including a plurality of solenoids connected to a rotatable shaft, a source of electric power to energize said solenoids, a rotary switch for said solenoids, a plurality of different area contacts spaced longitudinally of said switch, and means to move said switch longitudinally to control the speed of said motor.

6. A motor of the type described including a plurality of solenoids connected to a rotatable shaft, a source of electric power to energize said solenoids, and a rotary switch for said solenoids, said switch including a plurality of different area contacts to provide for different rates of speed for said motor.

7. A motor of the type described including a plurality of solenoids connected to a rotatable shaft, a source of electric power to energize said solenoids, and a rotary switch for said solenoids, said switch including a plurality of contacts of different size, and means to position any one of said contacts in the circuits of said solenoids.

In testimony whereof I hereunto affix my signature this 23 day of August, A. D. 1930.

EDWIN F. MOODYMAN.